April 25, 1961 G. EANNARINO ET AL 2,981,873

SEMICONDUCTOR DEVICE

Filed May 2, 1957

INVENTORS.
George Eannarino
and George B. Finn, Jr.
BY
Mason, Kolehmainen, Rathburn & Wyss
Attys.

United States Patent Office 2,981,873
Patented Apr. 25, 1961

2,981,873

SEMICONDUCTOR DEVICE

George Eannarino and George B. Finn, Jr., Bloomington, Ind., assignors to Sarkes Tarzian, Inc., Bloomington, Ind., a corporation of Indiana Filed May 2, 1957, Ser. No. 656,622
4 Claims. (Cl. 317—234)

The present invention relates to semiconductor devices, and more particularly to semiconductor diodes which are sturdy and compact in construction, reliable in use under severe environmental conditions, and suitable for assembly on a quantity production basis.

Diode rectifiers using semiconductor junctions have been on the market for a number of years, but for the most part these diodes leave much to be desired both in the way of cost and operation. For example, the current carrying capacity of such diodes has been small as compared to their overall size because of their inability, among other things, to dissipate the heat which is generated at the semiconductor junction during normal use. Moreover, although semiconductor rectifiers have many operational advantages over other types of rectifiers as, for example, selenium rectifiers, because of the difficulties encountered in the manufacture of semiconductor rectifiers and, moreover, because of the fragileness and low current capacity of the units which have been provided in the past, a satisfactory power rectifier of the semiconductor type has not as yet been made commercially available.

Therefore, a principal object of the present invention is to provide a new and improved semiconductor rectifier which has a high current capacity as compared to its overall size, which has a satisfactory forward-to-reverse current ratio, and which may be manufactured at a cost which is substantially less than that of other semiconductor rectifiers known in the prior art.

Another object of the present invention is to provide a new and improved semiconductor rectifier assembly which lends itself to high speed production and to quantity production techniques.

A further object of the present invention is to provide a new and improved rectifier assembly which is particularly suited for use in rectifier bridges such as may be used, for example, in the rectification of three-phase alternating voltage.

Another object of the present invention is to provide a new and improved semiconductor power rectifier which is durable in construction and which may be satisfactorily operated under conditions including severe temperature changes, shocks, vibrations and the like.

Briefly, the above and further objects are realized in accordance with the present invention by providing a rectifier assembly in which a semiconductor P–N junction device is mounted within an open ended cup-shaped housing. Preferably, the housing is conductive and one side of the junction is electrically connected thereto. A resilient connector is connected to the opposite side of the junction and protrudes from the open end of the housing. The semiconductor and the parts which are directly secured thereto are enclosed within a relatively solid insulating material such as an epoxy resin which fills the cavity in the housing. Preferably, the resin is relatively hard so as to increase the durability of the unit, and in order to maintain a resilient connection between the semiconductor and the portion of the connector which protrudes from the housing, a resilient insulating material such as silicon rubber encases a resilient portion of the resilient connector. The semiconductor is thus protected from direct shocks which might have been transmitted thereto by the resilient connector.

A plurality of rectifiers may be provided in a common package for use in those applications in which a plurality of rectifiers are interconnected in a network, such, for example, as in a three-phase rectifier. In accordance with this further aspect of the invention, a relatively simple and yet durable multiple unit is provided by forming a plurality of recesses or cavities in a single conductive member. In an illustrative embodiment of the invention, a metallic sheet is deformed as by stamping to provide a plurality of cup-shaped dimples and the rectifier assemblies are mounted in recesses defined by the dimples in the manner described above. There is thus provided a three-phase half-wave rectifier in a single unit of assembly, the assembly comprising a plurality of rectifiers with a common terminal, the plate. Moreover, the heat generated by the rectifier is dissipated by the relatively large surface area of the plate which provides a good thermal connection between the ambient and the semiconductor junction.

The invention both as to its organization and method of operation, together with further objects and advantages thereof, will best be understood by reference to the following detailed description taken in connection with the accompanying drawing, in which.

Figure 1:
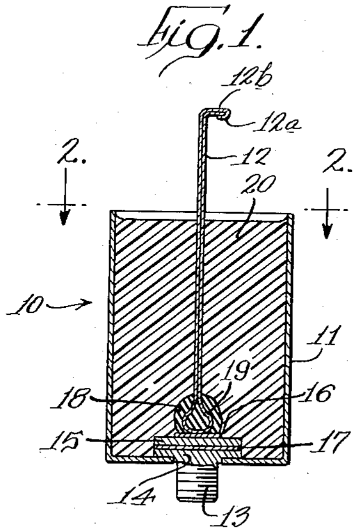
Fig. 1 is a cross-sectional view of a semiconductor diode embodying the present invention.
Figure 2:
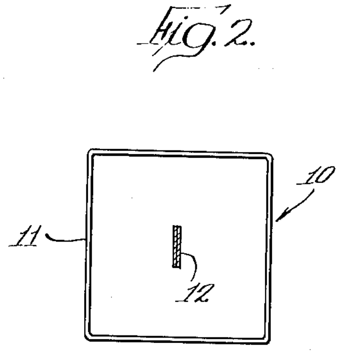
Fig. 2 is a sectional view taken along the line 2—2 of Fig. 1 assuming the entire structure to be shown therein.

Referring now to the drawing, and more particularly to Fig. 1 thereof, a semiconductor diode 10 comprises a cup-shaped conductive housing 11, which may, as best shown in Fig. 2, be rectangular in cross-section so as to be receivable in the jaws of a wrench; a resilient terminal member or contact 12 which extends from the open end of the housing 11; and a terminal stud 13 which is formed of a conductive material and partially extends through an aperture 14 in the bottom of the housing 11. For the purpose of facilitating attachment of the diode 10 to a support and to an electric circuit in which it is to be used, the portion of the stud 13 which protrudes from the housing 11 is threaded.

The principal components of the rectifier assembly, in addition to the terminal members 12 and 13, are a semiconductor wafer 15 having a P–N junction separating the opposite faces thereof, and a pair of conductive transition members 16 and 17 which are connected to opposite sides of the junction in the wafer 15 and to respective ones of the contacts 12 and 13. Preferably, the transition members 16 and 17 are formed of a conductive material having a thermal coefficient of expansion approximating that of the wafer 15. Accordingly, such metals as tantalum, niobium, molybdenum, and tungsten may be used.

A mass of resilient material 18 such, for example, as silicone rubber, encloses a loop 19 formed at the bottom of the contact 12 and soldered to the transition member 16. The loop 19 enables a resilient connection between the upper portion of the contact 12 and the wafer 15, which is quite fragile, and the resilient material 18 isolates the loop 19 from a fairly rigid insulating material 20 which fills the cavity of the housing 11. The rubber-like material 18 thus fills the space in the loop 19 and prevents the material 20 from rendering the contact 12 rigid. The insulating material 20, which may be, for example, an epoxy resin, helps to maintain contacts 12 and 13 and connected components assembled to the housing 11, seals the wafer 15 from the atmosphere, and insulates the opposite sides of the junction from one another.

As shown, the contact 12 is formed of a narrow strip of flexible, conductive material such, for example, as copper which is folded back upon itself to form a loop 19 at one end thereof. If desired, the upper end of the contact 12 may be bent over at right angles as shown in Fig. 1 and the end portion 12*a* of the upper member is wrapped over the end 12*b* of the lower member thereby to maintain the two halves of the terminal 12 in an assembled condition. The manner in which the terminal members 12 and 13 and the intermediate parts may be fused together is described in copending application, Serial No. 656,621, Finn et al., filed May 2, 1957 and assigned to the same assignee as the present invention.

Although the manner in which the diode 10 may be assembled will be clear from the above description, in order to emphasize the ease of manufacture of this device, a brief description of the relatively few steps employed in its assembly is given. After the stack-up of parts from the contact 12 to the contact 13 has been fused together in, for example, the manner described in the above referred to Finn et al. application, the stack of parts is inserted into the housing 11 so that the stud portion of the contact 13 extends through the aperture 14 and the body portion of the contact 13, which has a considerably greater cross-sectional area than the aperture 14, rests on the bottom of the housing 11. As shown in Fig. 1, the contact 13 may be provided with a flange which nicely fits within the aperture 14 so as to prevent transverse movement of the rectifier stack within the housing 11. With the parts thus supported within the housing and the resilient material 18 previously placed over the loop 19 in the contact 12, an uncured epoxy resin, which is thus in a liquid state, is poured into the housing to substantially cover the material 18. The unit is then placed in an oven to solidify and cure the resin. This completes the diode.

Figure 3:
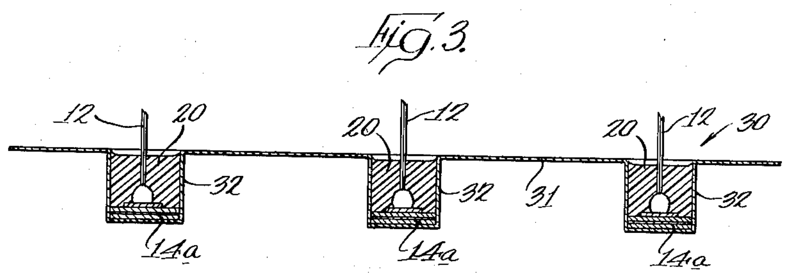
Fig. 3 is a sectional view of another embodiment of the invention in which a plurality of rectifiers are provided in a common package.

Referring to Fig. 3, there is shown a multiple rectifier assembly 30 which comprises a plate 31 formed of a good heat and electrical conductive material and in which a plurality of cup-shaped dimples 32 are punched. The plate 30 thus includes a plurality of cavities in which the principal components of individual rectifier units are mounted in substantially the same manner as described in connection with Fig. 1. Inasmuch as the individual rectifier units in the assembly 30 are substantially the same as that in the unit 10, similar parts are designated with like reference numerals. In the multiple rectifier unit 30 the dimples 32 are substantially cylindrical and the lower contact members, designated 14*a*, are circular and do not include a stud portion. In order to mechanically secure the contacts 14*a* in the dimples 32 and electrically and thermally connect the contacts 14*a* to the plate 31, the contacts 14*a* are press fitted into the bottoms of the dimples 32. The resilient contact members 12 extend upwardly from the open ends of the dimples 32 and are insulated from the plate 31 by the insulating filler material 20.

The multiple rectifier 30 is particularly suited for use as a half-wave rectifier in a three-phase system. When full-wave rectification of a three-phase A.C. voltage is to be provided, two such units may be employed by reversing the polarity of each of the individual rectifier units in one of the assemblies, thereby to provide one unit having a negative common terminal and heat sink and another unit having a positive common terminal and heat sink.

When a P–N junction is formed in a silicon wafer, for example, by alloying a portion thereof with aluminum, the maximum junction area as is commensurate with a given size wafer may be provided if the entire surface area on one side of the wafer is alloyed with the aluminum. However, in order to maintain the necessary large surface leakage path between the transition members which are fused to opposite sides of the wafer, it is necessary that one of the transition members have a cross-sectional area which is substantially less than the cross-sectional area of the adjacent side of the wafer. Therefore, in the rectifier unit 10 of Fig. 1 and in the multiple rectifier unit 30, the conductive housing is connected to the negative side of the junction rectifier and thus constitutes the negative terminal of the device.

Figure 4:
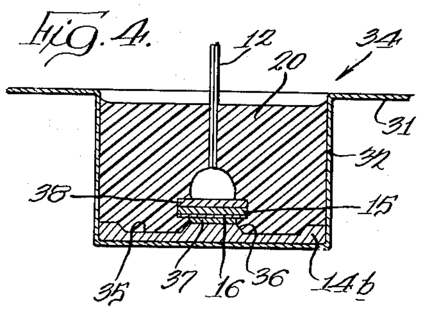
Fig. 4 is an alternative embodiment of the invention.

In order to provide a multiple rectifier unit in which the housing and thus the common terminal is connected to the anode of each of the devices, while at the same time maximizing the junction area in the semiconductor wafer, the contact member 14*b* shown in Fig. 4 may be employed. The member 14*b* is circular to be adapted to be press fitted into the cylindrical dimple 32 of the plate 31 and is provided with an annular recess 35 which surrounds a central boss 36 to which a small area transition member 37 is fused. A large area transition member 38 having an area at least as great as the adjacent surface of the wafer 15 is fused to the opposite side of the wafer 15. During the junction forming operation, a thin sheet of aluminum is interposed between the transition member 38 and the wafer 15 and when the temperature of the assembly is raised to approximately 1000° C. the aluminum alloys with the adjacent portion of the silicon wafer to effect a P–N junction across the full cross-sectional area of the wafer 15. It may thus be seen that when the P–N junctions are formed in the rectifier assemblies used in the assemblies of Figs. 1 and 3, the wafer 15 is alloyed from the bottom up, i.e., the sheet of aluminum is placed between the transition members 17 and the wafer 15 prior to heating the unit to the alloying temperature.

While the invention has been described in connection with a particular embodiment of the invention, it will be understood that various modifications may be made thereon which are within the true spirit and scope of the invention as defined in the appended claims.

What is claimed as new and desired to be secured by Letters Patent of the United States is:

1. A silicon diode comprising a semiconductor crystal having an alloyed P–N junction therein, the P-type portion of said crystal being silicon which was recrystallized in the alloying process, a large area contact member secured to the P side of said crystal, said large area contact member being connected to said crystal throughout the adjacent face of said crystal, a small area contact member secured to the N side of said crystal, said small area contact member being connected to said crystal throughout an area substantially less than that of the adjacent face of said crystal, and a terminal member having an area substantially larger than said small contact member, said terminal member having an upstanding boss which is secured to said small area contact member, the adjoining faces of said boss and said small area contact member being substantially equal in size and shape.

2. A diode as set forth in claim 1 which further includes an insulating housing defining a cavity therein, said crystal being disposed in said cavity, and said small area contact being a raised portion on a conductive member press-fitted into the bottom of said cavity.

3. A diode as set forth in claim 2 wherein said raised portion is formed by an annular recess in said conductive member, said recess underlying a continuous area of said wafer.

4. A rectifier unit and heat sink comprising a metallic sheet having a plurality of recessed portions therein, a plurality of unilaterally conductive units disposed respectively in said recesses with one side of each of said units electrically and thermally connected to said sheet, and a plurality of terminal members insulated from said sheet and respectively connected to the sides of said units which are electrically remote from said sheet, respective portions of each of said units being press fitted into the portions of said sheet defining said recesses.

References Cited in the file of this patent

UNITED STATES PATENTS

| | | |
|---|---|---|
| 2,688,110 | Domakski et al. | Aug. 31, 1954 |
| 2,725,505 | Webster et al. | Nov. 29, 1955 |
| 2,735,050 | Armstrong | Feb. 14, 1956 |
| 2,745,044 | Lingel | May 8, 1956 |
| 2,752,541 | Losco | June 26, 1956 |
| 2,809,332 | Sherwood | Oct. 8, 1957 |
| 2,830,238 | Gundmundsen | Apr. 8, 1958 |
| 2,852,722 | Noon | Sept. 16, 1958 |
| 2,862,158 | Stelmak et al. | Nov. 25, 1958 |
| 2,906,932 | Fedotowsky et al. | Sept. 29, 1959 |